(12) United States Patent
Brannen, Jr. et al.

(10) Patent No.: US 12,406,590 B2
(45) Date of Patent: Sep. 2, 2025

(54) METHODS AND SYSTEMS FOR ENSURING PROPER INSTALLATION OF TELECOMMUNICATION EQUIPMENT

(71) Applicant: ADTRAN, Inc., Huntsville, AL (US)

(72) Inventors: Donald Larry Brannen, Jr., Huntsville, AL (US); James Todd Manley, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 900 days.

(21) Appl. No.: 17/318,697

(22) Filed: May 12, 2021

(65) Prior Publication Data

US 2022/0366804 A1 Nov. 17, 2022

(51) Int. Cl.
*G09B 5/06* (2006.01)
*G06T 7/00* (2017.01)
*H04W 16/22* (2009.01)

(52) U.S. Cl.
CPC ............... *G09B 5/06* (2013.01); *G06T 7/001* (2013.01); *H04W 16/22* (2013.01); *G06T 2207/10004* (2013.01); *G06T 2207/30164* (2013.01)

(58) Field of Classification Search
CPC . G09B 5/06; G06T 7/001; G06T 2207/10004; G06T 2207/30164; G06T 2207/10016; G06T 2207/10024; G06T 2207/20081; G06T 2207/20084; H04W 16/22; H04W 24/02

See application file for complete search history.

(56) References Cited

U.S. PATENT DOCUMENTS

| 10,650,597 | B2 | 5/2020 | Koohmarey |
| 2012/0065944 | A1* | 3/2012 | Nielsen ............... G06Q 50/06 703/1 |
| 2012/0075343 | A1 | 3/2012 | Chen et al. |
| 2012/0165648 | A1* | 6/2012 | Ferrantelli ........ A61B 5/1128 600/407 |
| 2013/0031202 | A1 | 1/2013 | Mick et al. |
| 2017/0097236 | A1 | 4/2017 | Bender et al. |

(Continued)

OTHER PUBLICATIONS

International Search Report for PCT/US2022/028971 mailed on Aug. 18, 2022.

(Continued)

*Primary Examiner* — Jack Yip
(74) *Attorney, Agent, or Firm* — Jon E. Holland; Butler Snow LLP

(57) ABSTRACT

The present disclosure generally relates to systems and methods for ensuring proper installation of telecommunication equipment. A system in some embodiments has a mobile device equipped with an image sensor that is used to acquire one or more images of a telecommunication equipment component that has been installed. The mobile device may then evaluate at least one such image to determine whether the component has been correctly installed. In addition, the evaluation performed by the mobile device may also be used to ensure that a captured image of the component meets certain predefined criteria for helping the user to capture a quality image of the component for the purpose of proving that it has been correctly installed. Thus, it is more likely that the image will be later useful for establishing that the component has been correctly installed, thereby possibly preventing the need for a truck roll.

15 Claims, 13 Drawing Sheets

(56) References Cited

U.S. PATENT DOCUMENTS

| | | | |
|---|---|---|---|
| 2017/0312031 A1* | 11/2017 | Amanatullah | A61B 34/10 |
| 2017/0352282 A1 | 12/2017 | Anderson et al. | |
| 2018/0096215 A1* | 4/2018 | Bartoshesky | H04N 23/51 |
| 2020/0193708 A1* | 6/2020 | Maggiore | H04W 4/029 |
| 2020/0250890 A1 | 8/2020 | Zhou et al. | |
| 2022/0351365 A1* | 11/2022 | Fowler | H04L 41/16 |
| 2023/0068660 A1* | 3/2023 | Brent | G06F 9/453 |

OTHER PUBLICATIONS

RD3, "Pocket Forms," http://rd3inc.com/pocket-forms/, May 2021, pp. 1-3.

* cited by examiner

METHODS AND SYSTEMS FOR ENSURING PROPER INSTALLATION OF TELECOMMUNICATION EQUIPMENT

TECHNICAL FIELD

The present disclosure generally relates to the installation of telecommunication equipment, and more particularly, methods, systems, apparatuses, and non-transitory computer readable media for ensuring the proper installation of telecommunication equipment.

RELATED ART

The installation of telecommunication equipment can be a difficult and error-prone task. Telecommunication networks often cover a large geographic area with numerous connection points. The scope and performance requirements of telecommunication networks necessitate the use of a large amount of equipment with complex connections in order to handle a large number of connection points and to provide the expected high-bandwidth communication channels. This makes installing telecommunication equipment, particularly in the large numbers required for new or upgraded networking facilities, a difficult and error prone task.

Various testing techniques have been developed to test line connectivity and performance. However, it can be difficult to test telecommunication equipment until most (if not all) of the installation is completed, after which it can be expensive and time-consuming to find any errors in the installation. This is particularly the case for network technicians, who may only be responsible for installing a specific type of equipment. In this case, defects are often resolved by re-sending installers back to the installation site after most of the installation has finished, which consumes a significant amount of time and resources for the technician. In addition, current testing techniques are unable to detect many types of installation and configuration problems making it difficult to discover and diagnose at least some problems.

In an effort to prove that a technician has correctly installed telecommunication equipment, the technician performing an install often takes photographs of the installed equipment. In some cases, the technician may use a mobile device with a camera that stores photographs taken by the technician for a particular job and correlates the photographs with the job identifier so that the photographs can be easily found and retrieved later if there is a suspected problem with the installation. If a problem is detected with the telecommunication line connected to the installed equipment, the technician or other user can access the photographs to confirm whether installation was performed correctly or whether there is an installation problem that needs to be corrected by dispatching another technician to the site of the equipment, sometimes referred to as a "truck roll." That is, the photographs may be useful in diagnosing whether any installation problems are likely, thereby eliminating the need for at least some truck rolls to inspect the installed equipment.

Unfortunately, the photographs associated with an installation job are sometimes insufficient for confirming whether the equipment has been correctly installed. As an example, in some cases, the technician may do a poor job in capturing photographs for the purpose of ensuring correct installation. For example, the captured photographs may be out of focus or taken at a poor angle relative to the equipment. In some cases, the photographs may not even include a particular component of the equipment for which correct installation needs to be confirmed. If correct installation cannot be confirmed by the photographs, a technician may be needlessly dispatched to the site of the equipment to confirm whether it has been correctly installed. Thus, cheaper and more reliable ways of ensuring correct installation of telecommunication equipment are greatly desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for ensuring proper installation of telecommunication equipment. In one exemplary embodiment, a mobile device equipped with an image sensor is used to acquire one or more images (e.g., a stream of image frames) of a telecommunication equipment component that has been installed. At least one such image can then be used to evaluate whether the component has been correctly installed. More specifically, the mobile device has stored data about the characteristics of the component and what features the component should have if it is properly installed. The mobile device compares at least one image, for example, by extracting information from the image, to this data to evaluate how the component is installed. The mobile device can then output the result of this evaluation to the user, such as an install technician, to enable the user to correct the installation of the telecommunication equipment component if necessary. In addition, the evaluation performed by the mobile device may also be used to ensure that a captured image of the component meets certain predefined criteria for helping the user to capture a quality image of the component for the purpose of proving that it has been correctly installed. Thus, it is more likely that the image will be later useful for establishing that the component has been correctly installed, thereby possibly preventing the need for a truck roll.

Figure 1:
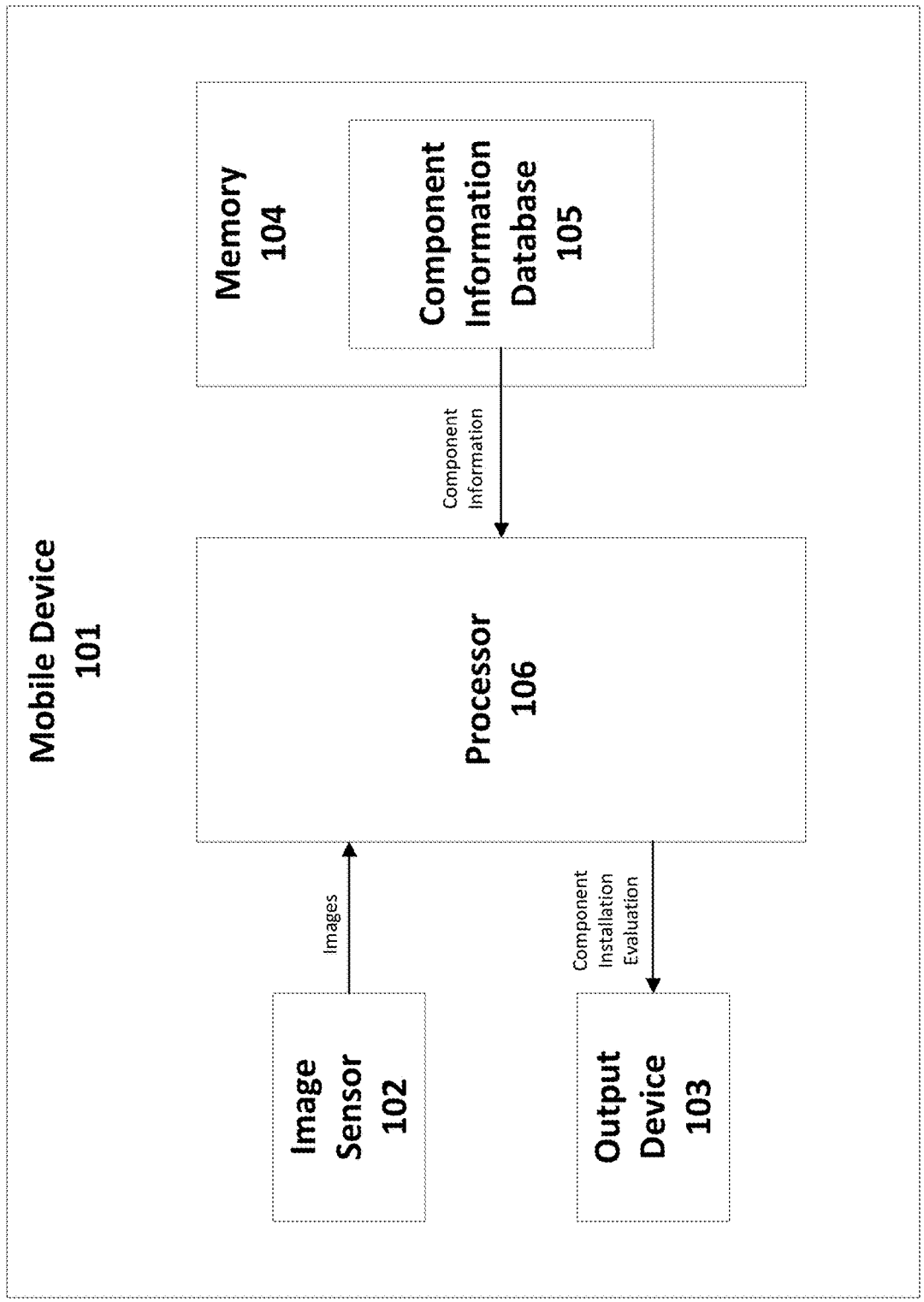
FIG. 1 is a block diagram of an exemplary embodiment of a mobile device.

FIG. 1 shows a diagram of an exemplary mobile device 101 in accordance with an exemplary embodiment of the present disclosure. The mobile device 101 comprises at least one processor 106 that is connected to an image sensor 102, an output device 103, and a memory 104. The image sensor 102 may be an optical sensor capable of capturing a digital image in the form of a grid of pixels. The processor 106 can retrieve this digital image in order to perform various operations using the data. Further, the memory 104 may be a memory device capable of storing digital data. The processor 106 can retrieve data stored in the memory 104 to perform various operations using this data. In the exemplary embodiment shown by FIG. 1, part of the data stored within the memory 104 is a component information database 105, which contains information about various telecommunication equipment components, their characteristics, and what features the components should have if they are properly installed. Finally, the output device 103 is capable of communicating information to a user through some mechanism, such as a digital screen. The processor 106 is capable of interacting with the output device 103 to transmit data to the user.

In operation, the processor 106 is capable of using the data contained in the component information database 105 to evaluate an image retrieved from the image sensor 102. As a result of this evaluation, the processor 106 can make a determination about whether the image shows a telecommunication equipment component that is correctly installed. The processor 106 can then interact with the output device 103 to communicate this determination (e.g., that the component displayed in the image is correctly installed) to the user. One exemplary use case for the mobile device 101 is by field technicians installing equipment at the edge of a telecommunications network. The location the equipment is installed typically covers a neighborhood or other similarly sized area. This often results in a large number of endpoints connected to the network edge, which in turn, requires a large amount of equipment and cross connections to enable service.

Figure 2:
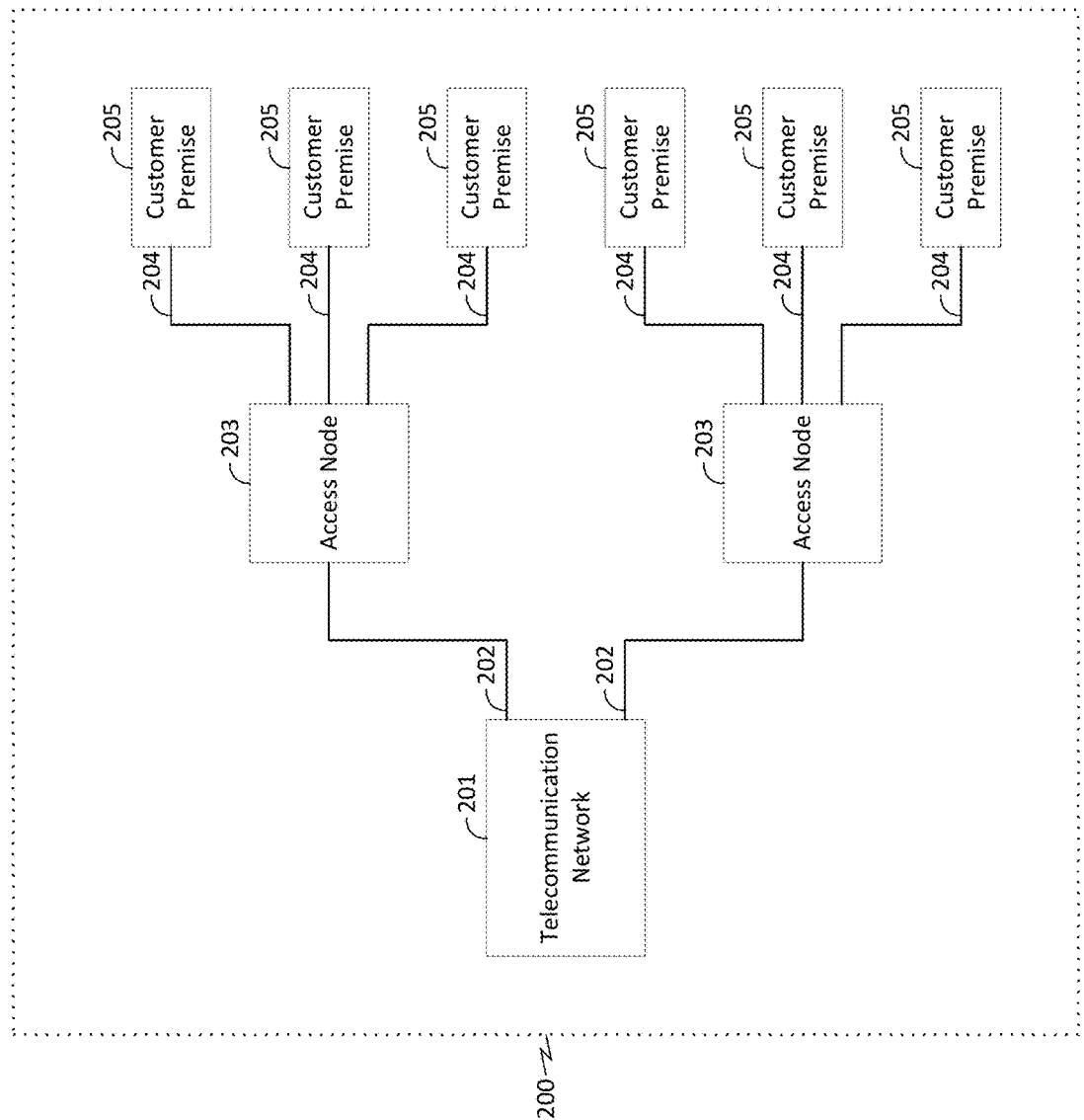
FIG. 2 is a block diagram of a conventional telecommunication network.

FIG. 2, gives an overview of the design of a typical telecommunication system 200. As shown by FIG. 2, the telecommunication system 200 allows data to be communicated between a plurality of customer premises 205 and a telecommunication network 201. The telecommunication network 201 may include or connect the customer premises 205 to (through the access nodes 203) any number of conventional networks, such as the public switched telephone network (PSTN), internet, cellular network, etc.

To link the customer premises 205 to the telecommunication network 201, a tree topology may be formed, with various interfaces multiplexing (and de-multiplexing) from fewer higher-bandwidth connections towards the telecommunication network 201 to more lower-bandwidth connections towards the customer premises 205. For example, a typical configuration is depicted by FIG. 2, where at least one access node 203 acts to divide the capacity of a high-bandwidth connection 202 to the telecommunication network 201 among the plurality of customer premises 205. As shown by the figure, an access node 203 is connected to the telecommunication network 201 by one or more distribution lines 202, which acts as a high-speed data channel that carries data to and from the telecommunication network 201 and the access node 203 (and ultimately to and from the plurality of customer premises 205). In general, a distribution line 202 can be any physical transmission medium, such as one or more optical fibers or twisted pairs. Note that an access node 203 may be positioned at any location, such as a central office or any intermediate location between a central office and one or more customer premises, such as a remote terminal or distribution point.

Each access node 203 is also connected to the plurality of customer premises 205 by one or more drop lines 204, also sometimes referred to as "subscriber lines." A drop line 204 acts as a high-speed data channel that carries data to and from the access node 203 and a customer premise 205. Equipment at the access node 203 serves to de-multiplex data from the access node's distribution line 202 onto the appropriate drop line 204. For data being sent to the telecommunication network 201, equipment at the access node multiplexes data received from the customer premises 205 onto the distribution line 202. Like with the distribution lines 202, a drop line 204 can be any physical transmission medium capable of providing sufficient bandwidth, such as one or more optical fibers or twisted pairs.

Figure 3:
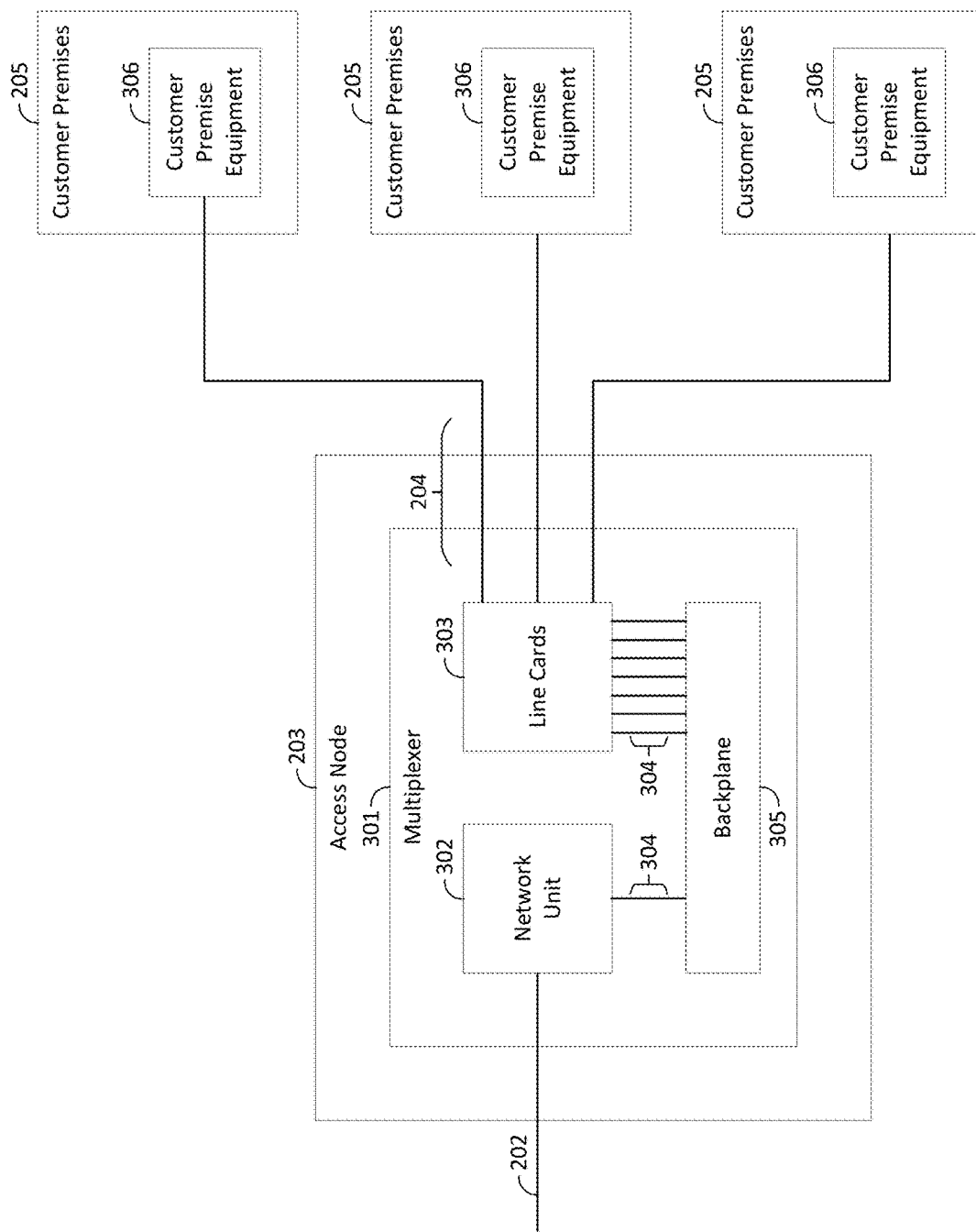
FIG. 3 is a block diagram of an exemplary embodiment of an access node, such as is depicted by FIG. 2.

For example, FIG. 3 shows an exemplary embodiment of an access node 203 illustrating some of this complexity. The access node 203 comprises a multiplexer 301 that multiplexes and demultiplexes data from a distribution line 202 onto a plurality of drop lines 204. The multiplexer 301 comprises a network unit 302 (such as an optical network unit (ONU) or a DSL network unit) that is coupled to a plurality of line cards 303 through a backplane 305. In this embodiment, the ONU 302 and the line cards 303 connect to the backplane 305 through intermediate backplane patch cables 304. In other embodiments, the ONU 302 and the line cards 303 may directly interface with the backplane 305 through built in electrical contacts on the ONU 302 and the line cards 303 and through built in electrical contacts, i.e., a socket, on the backplane 305.

The line cards 303 are also each connected to a plurality of customer premise equipment 306 (CPE) located at each customer premise 205 through the drop lines 204. In this embodiment, the line cards 303 are connected to the drop lines 204 directly. In some embodiments, line cards 303 may connect to the drop lines 204 directly or alternatively through the backplane 305 or other type of connection assembly.

In operation, the network unit 302 receives a data signal (such as an optical data signal, if the network unit 302 is an ONU) from the distribution lines 202 and demodulates the data signal to recover the data carried by the signal. The network unit 302 then transmits any incoming data to the appropriate line card 303 that is connected to the customer premise equipment 306 (and therefore to the customer premise 205) the data is destined for. Thus, the network unit 302 receives the data signal transmitted across the distribution line 202, converts the received data signal, and then transmits the data signal through the backplane 305 (and through intermediate backplane cables 304) to the appropriate line card 303. After receiving data from the network unit 302, the receiving line card 303 may then transmit the received data to the appropriate customer premise equipment 306 (located at a customer premise 205) through the appropriate drop line 204.

Because of the complexity and number of connections and equipment present at an access node 203, installation errors are common. Present methods to reduce or prevent these errors can be costly and time consuming. For example, when a problem with a subscriber line or other telecommunication line is detected, expensive and time-consuming diagnostics may be performed in an effort to diagnose the source of the problem. In some cases, a truck roll is performed so that trained technicians travel to the site of the telecommunication equipment for inspecting such equipment to ensure that it has been correctly installed.

To better address these issues, embodiments of the present disclosure use a mobile device to verify that certain telecommunication equipment, or particular components of telecommunication equipment, are correctly installed. Specifically, embodiments of the present disclosure may obtain images from a mobile device's imaging sensor, e.g., a mobile device's camera, showing telecommunication equipment. This image may then be processed to determine how the pictured telecommunication equipment is installed. The extracted information on how the pictured telecommunication equipment is installed can then be compared to stored data detailing how the telecommunication equipment should be installed. The conclusion of this comparison can then be given as output detailing whether or not the image shows telecommunication equipment that is correctly installed.

Figure 4:
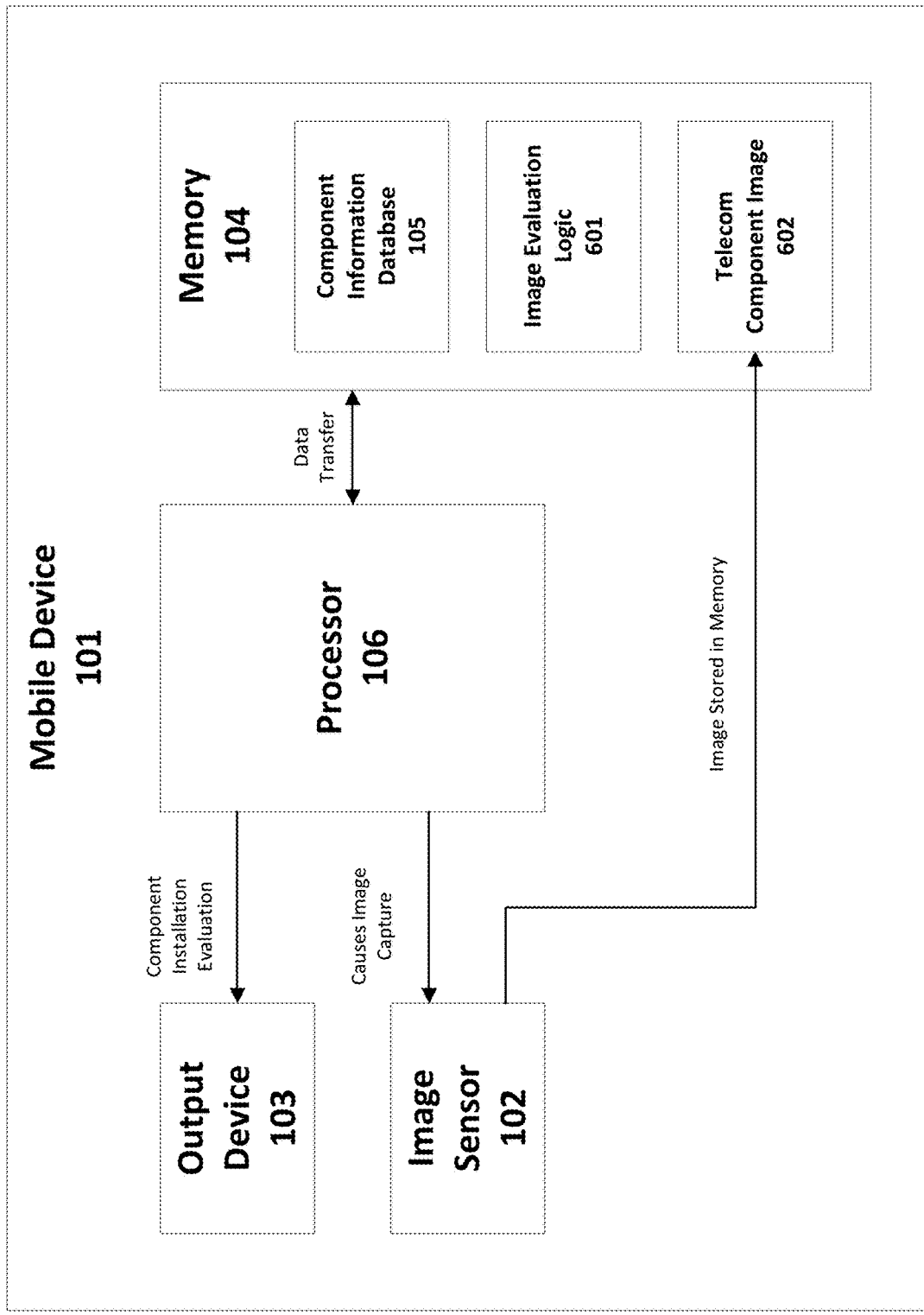
FIG. 4 is a block diagram of a second exemplary embodiment of a mobile device.

FIG. 4 shows a more detailed diagram of the exemplary mobile device 101 shown in FIG. 1, in accordance with an exemplary embodiment of the present disclosure. As previously described, the processor 106 can interact with the image sensor 102 to capture a digital image. This digital image may be stored in the memory 104 as telecom component image 602. Note that the image evaluation logic 601 can be implemented in software, hardware, firmware or any combination thereof In the exemplary mobile device 101 illustrated by FIG. 6, the image evaluation logic 601 is implemented in software and stored in memory 104. When implemented in software, the image evaluation logic 601 can be stored and transported on any computer-readable medium for use by or in connection with an instruction execution apparatus that can fetch and execute instructions, such as the processor 106. In the context of this document, a "computer-readable medium" can be any means that can contain or store a computer program for use by or in connection with an instruction execution apparatus.

Figure 5:
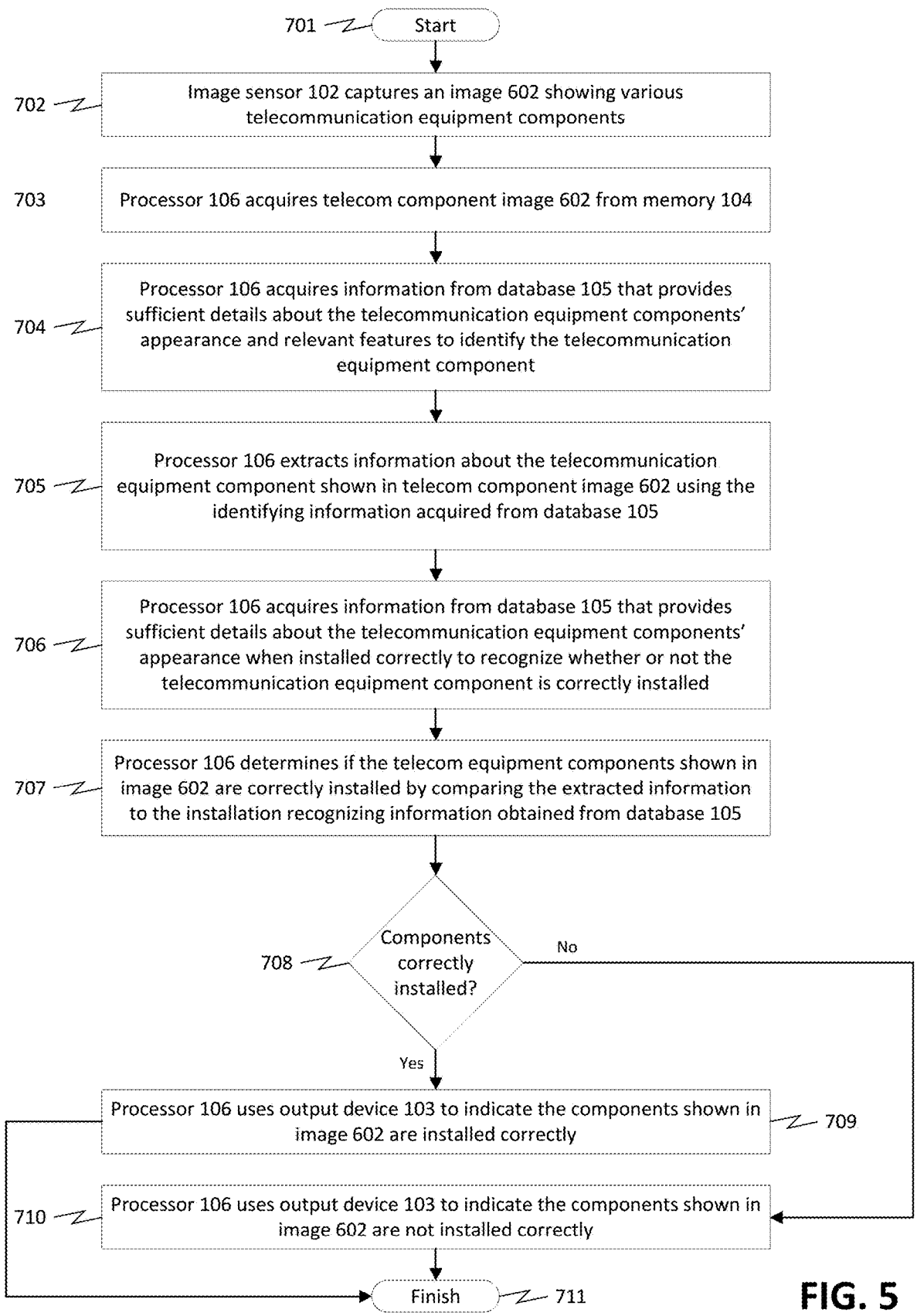
FIG. 5 is a flowchart of an exemplary method of evaluating the installation of a telecommunication equipment component.

FIG. 5 is a flowchart illustrating a process of verifying the installation of telecommunication equipment as just described. To start, the mobile device 101 may first acquire an image of one or more telecommunication equipment components. Specifically, as shown by block 702 of FIG. 5, the processor 106 may interact with the image sensor 102 to cause the image sensor to capture a telecom component image 602. The telecom component image 602 may show various pieces of telecommunication equipment, such as the line cards 512, the chassis 508, the network switch 503, and the like. The telecom component image 602 may also show individual components or parts of one or more pieces of telecommunication equipment, such as screws used to secure the chassis 508 to the rack 502 or power cables used to connect the network switch's power source 602 to a nearby power supply. The telecom component image 602 may also show various cables used to connect various telecommunication equipment to one another, such as a distribution line 202 or a drop line 204. Once the image sensor 102 has captured the telecom component image 602, the image may be stored in the memory 104 for use by the processor 106.

After telecom component image 602 has been captured, as shown by block 703 of FIG. 5, the processor 106 may retrieve the component image 602 from the memory 104. As shown by block 704 of FIG. 5, after the processor 106 has retrieved the telecom component image 602, the processor 106 may access the component information database 105 to retrieve information that can be used to identify the telecommunication equipment components (and certain features of these components) shown in the telecom component image 602. More precisely, the processor 106 retrieves information that includes what a component from the same model as the telecommunication equipment should look like, i.e., the prototype or model that each component is (within certain tolerances) a replica of. At a high level, this information ultimately relates pixels from an image, such as the telecom component image 602, to specific models of telecommunication equipment components. The information retrieved by the processor 106 also allows the processor 106 to identify certain relevant features of the telecommunication equipment components shown in the image.

In some embodiments, the information retrieved by the processor 106 may be similar to the information that a human would use to identify a particular component. As simplistic example, the equivalent information to a human for identifying a certain specific model of line card could be that only this specific line card model has 16 square lights, a power button on the right-hand side, two Ethernet ports, and a grey faceplate. However, a difference between these two processes is that the information retrieved by the processor 106 may make explicit tasks that are handled subconsciously or not handled at all by the human visual system. For instance, the equivalent human information speaks immediately in terms of specific objects or parts of objects whereas the information retrieved by the processor 106 may start in terms of pixels. In addition, a processor 106 is capable of identifying differences between the components that are installed correctly and components that are install incorrectly that are not even noticeable by a human observer.

Note that, in some embodiments, the processor 106 may retrieve information about all or some subset of the telecommunication components on which it has identifying information. The processor 106 may the then scan the image for each of these components. Alternatively, the processor 106 may be instructed as to what telecommunication equipment component (or group of components) that the processor 106 should identify in the telecom component image 602. For example, a user may, as part of initiating the process of capturing telecom component image 602, indicate the telecommunication equipment components for which the image should be evaluated.

The specifics of how this information relates pixels to specific telecommunication equipment components (e.g., such as how the information is structured or how it is applied) may vary. One family of approaches involves various machine learning techniques. For example, the information may comprise a kernel function that maps images to some N-dimensional space and one or more associated decision boundary (e.g., an (N–1)-dimensional hyperplane) that separates points in the mapped space corresponding to images showing the specific telecommunication equipment component from points in the mapped space corresponding to images not showing the specific telecommunication equipment. As another example, the information may comprise a neural network, such as a neural network 801 discussed below.

After retrieving the identifying information, as shown by block 705 of FIG. 5, the processor 106 may then use the identifying information to extract information about the telecommunication equipment components (and certain features of these components) that are shown in the telecom component image 602. Specifically, the information may be used to identify the telecommunication equipment components shown in the image and to identify certain features (including identifying particular states of these features, e.g., their orientation or color) of the identified components. These features can be useful in evaluating the install state, e.g., whether the installation is correct, of the telecommunication equipment components shown in the image. For example, if the identifying information comprises a kernel function and associated decision boundaries, extracting information from the telecom component image 602 may comprise providing the image 602 (e.g., in the form of an m×n grid of pixels) to the kernel function as input and determining one subspace (as defined by the associated decision boundaries) to which the image 602 is mapped. As another example, if the information comprises a neural network, extracting information may involve providing the image 602 as input to, and retrieving the output from, the neural network, such as the process used with the neural network 801 discussed below.

After the information about the telecommunication equipment components shown in the telecom component image 602 is extracted, as shown by block 706 of FIG. 5, the processor 106 may access the component information database 105 to retrieve information that can be used to recognize whether the identified telecommunication equipment components are correctly installed. More precisely, the processor 106 retrieves information that includes what features (and what feature states) a component of the same model as the telecommunication equipment should look like when correctly installed, i.e., the prototype or model of which each component is (within certain tolerances) a replica. Since the telecommunication equipment components and their relevant features may have already been identified, the retrieved information may not have to relate the pixels from an image to a correct installation state, like with the identifying information discussed above. Rather, the information may correlate identified features (and feature states, e.g., orientation) or combinations of identified features to install states. Alternatively, the information retrieved may ultimately relate pixels from an image to correctly installed (or incorrectly installed) telecommunication equipment components.

To extend the previous analogy for the identifying information, the installation recognizing information retrieved by the processor 106 may be similar to the information that a human would use to identify determine if a particular component is correctly installed. As a simplistic example, the equivalent information to a human for recognizing if a certain specific model of line card is correctly installed could be that this specific model of line card is only correctly installed if it has screws in all four corners of its face plate and has a lit green connectivity light.

After retrieving the installation recognizing information, as shown by block 707 of FIG. 5, the processor 106 may then determine whether the telecommunication equipment components shown in the telecom component image 602 are correctly installed by comparing the extracted information about the telecommunication equipment components shown in the telecom component image 607 to the retrieved installation recognizing information. Specifically, the extracted information about particular features of the telecommunication equipment components is compared to information about the particular features that the telecommunication equipment component should have if it is correctly installed. If the telecommunication equipment component has a sufficient number of these features, the component may be determined to be correctly installed. Additionally, the features of the telecommunication equipment components may also be compared to information about the particular features that the equipment component should not have if it is correctly installed. If the telecommunication equipment component has a sufficient number of these features, the component may be determined to have not been correctly installed.

Note that the retrieved identifying information and the retrieved installation recognizing information may be implicit, rather than explicit. For example, the information could be encoded as part of the structure of a neural network, such as the neural network 801 discussed further below. Also note that the process of identifying the telecommunication equipment component from the image and recognizing if the telecommunication equipment component is installed correctly may happen simultaneously. They may also be combined, either implicitly or explicitly, into a single process. For example, a neural network, such as the neural network 801 discussed further below, may be trained to recognize only telecommunication equipment components that are correctly installed, thereby excluding components that are installed incorrectly. As a result, the neural network implicitly determines if the features of the telecommunication equipment component indicate it is installed correctly in the process of identifying the telecommunication equipment components.

Based on the determination of whether the telecommunication equipment components shown in the telecom component image 602 are correctly installed, the processor 106 may then provide an output indicating the result of this determination. Specifically, as shown by blocks 708, 709, and 710 of FIG. 5, the processor 106 may interact with the output device 103 to communicate whether the telecommunication equipment components shown in the telecom component image 602 are correctly installed or not. If multiple telecommunication equipment components are shown, this output may specify for each component whether the component is successfully installed or not.

Figure 6:
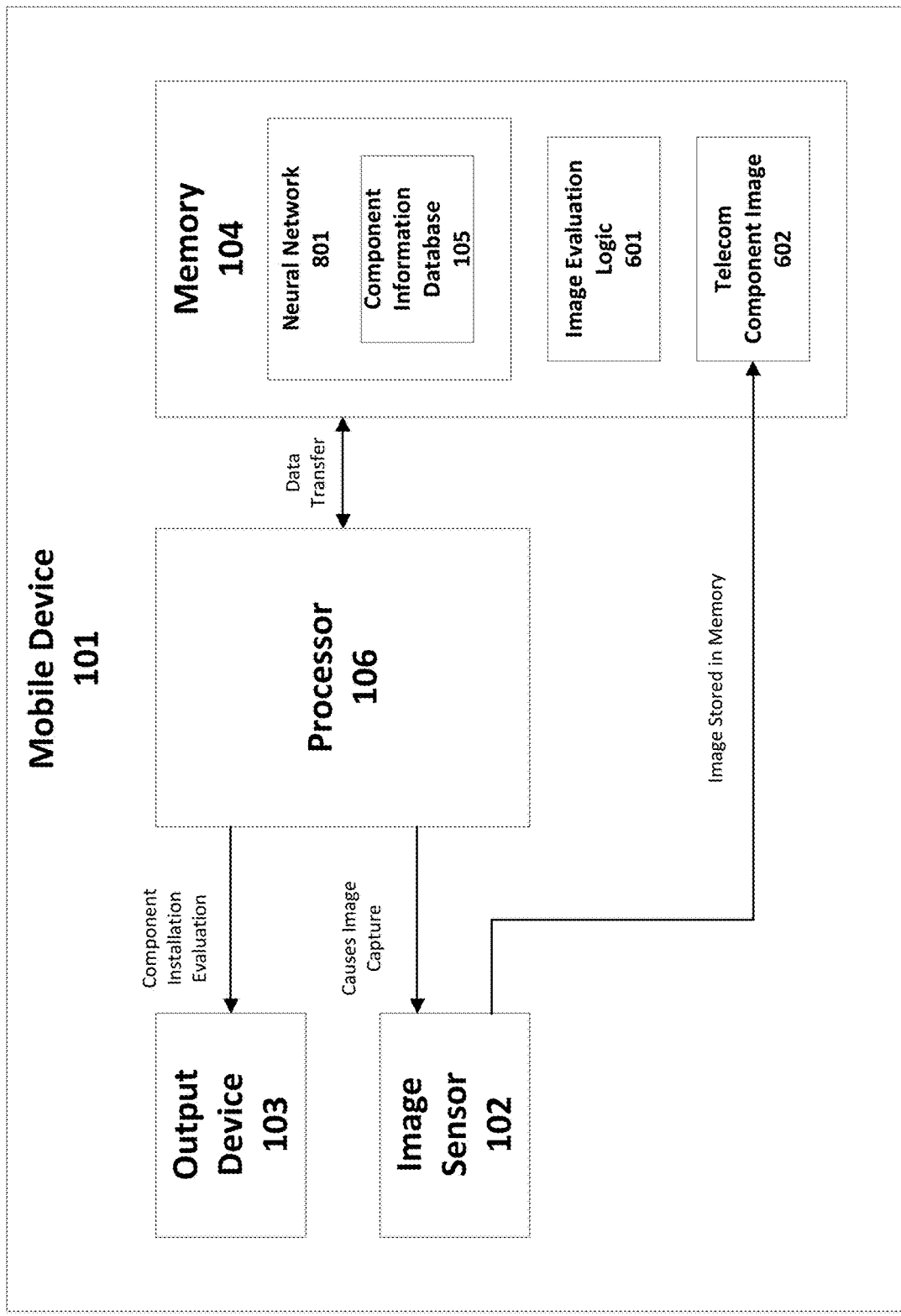
FIG. 6 is a block diagram of a third exemplary embodiment of a mobile device utilizing an artificial neural network.

In some embodiments, the process of evaluating the telecom component image 602 may be performed by an artificial neural network. Specifically, as shown in FIG. 6, a neural network 801, which may be a convolutional neural network, may be stored in the memory 104. The neural network 801, may contain, as part of its structure, component information database 105. When a neural network is used to evaluate the telecom component image 602, instead of retrieving only information from the component information database 105, the processor 106 may retrieve the neural network 801, which includes the component information database 105 as part of its internal structure. The processor 106 may then evaluate the telecom component image 602 by running the neural network with the telecom component image 602 given as input to the neural network. As part of the built-in structure and operation performed by the neural network, the neural network may intrinsically identify the telecommunication equipment components shown in the telecom component image 602 and intrinsically extract information about certain features of the components. The neural network 801 may then compare this extracted information (as an intrinsic operation engendered by its structure) to information embedded in the neural network detailing what features the telecommunication equipment components shown in the telecom component image 602 should have if the components are correctly installed.

For example, the neural network may be structured such as various features (and various feature states) make it more or less likely that a particular telecommunication equipment component is installed correctly. If this results in a probability more than a certain threshold, for example, more than 95% likely, then the neural network may indicate the telecommunication equipment component is installed correctly. Alternatively, if the probability is less than a certain threshold, then the neural network may indicate the telecommunication equipment component is not installed correctly.

In terms of the creation of the neural network 801, the neural network 801 may be trained on images. Some of these images may show correctly installed telecommunication equipment components and some images may show incorrectly installed telecommunication equipment components. Along with each image, the neural network is given the name, location (as indicated by a bounding box), and installation state of the telecommunication equipment shown in the image. By training the neural network on these images, the neural network's structure is changed such that it can identify, with high probability, if an image shows a telecommunication equipment component, but (in this embodiment) only if that component is installed correctly. In other words, the neural network learns not just a category that includes the telecommunication equipment component and excluding any other telecommunication equipment components (or another objects), but that only includes the telecommunication equipment component if it is correctly installed (and excludes it from the category if it is not correctly installed). Additionally, the neural network 801 may be a composite of two neural networks. The output of the first network may be an off-the-shelf neural network trained to process an image into objects (e.g., performs the task of determining the existence and location, but not identity, of objects in an image) The output of this neural network may be provided as input to a second neural network, which may be trained to identify which objects are telecommunication equipment components and to recognize if the components are installed correctly.

Based on this determination, the neural network 801 may output a list detailing the detected telecommunication equipment components, coordinates defining a bounding box within the telecom component image 602 where the components were detected, whether the component is correctly installed or not, and a confidence level indicating the probability that the detection is correct. The processor 106 may utilize this information and determine, based on instructions from the image evaluation logic 601, if the neural network's confidence in the detected components exceeds a threshold value. If the neural network's confidence in the detected components exceeds a threshold value and the neural network 801 indicated the components were correctly installed, the processor 106 may provide an output indicating the result of the determination made by the neural network 801. Specifically, the processor 106 may interact with the output device 103 to communicate whether or not the telecommunication equipment components shown in the telecom component image 602 are correctly installed. If multiple telecommunication equipment components are shown, this output may specify for each component whether or not the component is successfully installed.

In some embodiments, the neural network 801 may be trained on a dataset of images depicting various telecommunication equipment and telecommunication equipment components. If the neural network 801 is being trained using supervised learning, these images may be labeled to identify the name and location of the telecommunication equipment within the image. The neural network 801 may also be trained on a dataset of images depicting various telecommunication equipment that is correctly installed and that is incorrectly installed. If the neural network 801 is being trained using supervised learning, these images may be labeled to identify the name and location of the telecommunication equipment components within the image as well as whether (for any particular telecommunication equipment component shown in the image) the telecommunication equipment component is correctly installed.

The use of mobile devices, like the mobile device 101 shown by FIG. 6, comes with several inherent advantages with respect to verifying the correct installation of telecommunication equipment. One advantage is the ready availability and widespread use of mobile devices, particular with respect to smartphones and tablets. Specifically, many, if not most, field technicians and other installers of telecommunication equipment already carry smartphones as part of equipment or supplies they carry with them to any installation job. Another advantage is the small size and easy portability provide by mobile devices. This can make taking photographs of telecommunication equipment components quick and convenient, since mobile devices are readily held, aimed, or otherwise manipulated by users quickly and easily.

Because the device 101 is mobile, the device 101 can be carried by a human user, such as the technician who is performing equipment installation. Note that the location and orientation of the image sensor 102 (and hence, the location and orientation of mobile device 101) relative to the telecommunication equipment components being imaged strongly affect the quality of images taken by the mobile device (for the purpose of evaluating the installation of the telecommunication equipment components. As discussed more thoroughly below, the quality of an image refers to a variety of parameters about the component image 602, such as light level, the focus of the image, the orientation of the image with respect to the ground or the telecommunication equipment components being imaged, whether the telecom equipment components are centered or viewable in the image or are partially cut-off by the sides, and the like. The quality of an image may affect the ability of the processor 106 to accurately evaluate the image. It may also (for cases where the component image 602 is saved) affect the value of the component image 602 for use as evidence proving that any telecommunication equipment shown in the image is correctly installed.

To aid the user in correctly positioning the mobile device (and thus correctly positioning the image sensor 102) to capture quality images showing particular telecommunication equipment components, some embodiments may use output device 103 to display the current view captured by the image sensor 102. Specifically, in some embodiments, the output device 103 is a digital display. Additionally, image sensor 102 is also capable of taking images (also called frames) continuously once every time interval, such as every 16.6 ms (i.e., 60 time per second, resulting in 60 frames per second (fps)). To aid the user in positioning the mobile device 103 so that an image showing the desired telecommunication equipment components is captured, the processor 106 may interact with the digital display 103 to cause these images to be shown as they are taken. In other words, since continuous still images displayed after one another fast enough appear as a continuous moving video to a human observer, the processor 106 may cause the digital display 103 to show a live video stream of what the image sensor 102 is "seeing."

Figure 7:
FIG. 7 is an illustration of an exemplary mobile device based on a smartphone.

FIG. 7 is an illustration of an exemplary mobile device having a digital screen as just described. Specifically, FIG. 7 shows a typical smartphone 901 possessing a touch screen 904 on one side and a camera 905 on an opposite side. The touch screen 904 covers much of the device's front side 902 and corresponds to the output device 103 of FIG. 1. The touch screen 904 is capable of giving output by displaying images (and video, by adjusting the images quickly enough), which it can accomplish by controlling the output of a grid of pixels. The touch screen 904 is also capable of receiving user input in the form of taps, gestures, and other physical interactions with the screen. The camera 905, on the other hand, is located on the upper portion of the device's back side 903 and it corresponds to the imaging sensor 102 of FIG. 1. The camera 905 is capable of capturing images it can "see," by capturing the intensity and color of visible light striking the image sensor 905. Not shown are the processor and memory internal to the smartphone 901 but which function similarly to the processor 106 and the memory 104 of FIG. 1.

Figure 8:
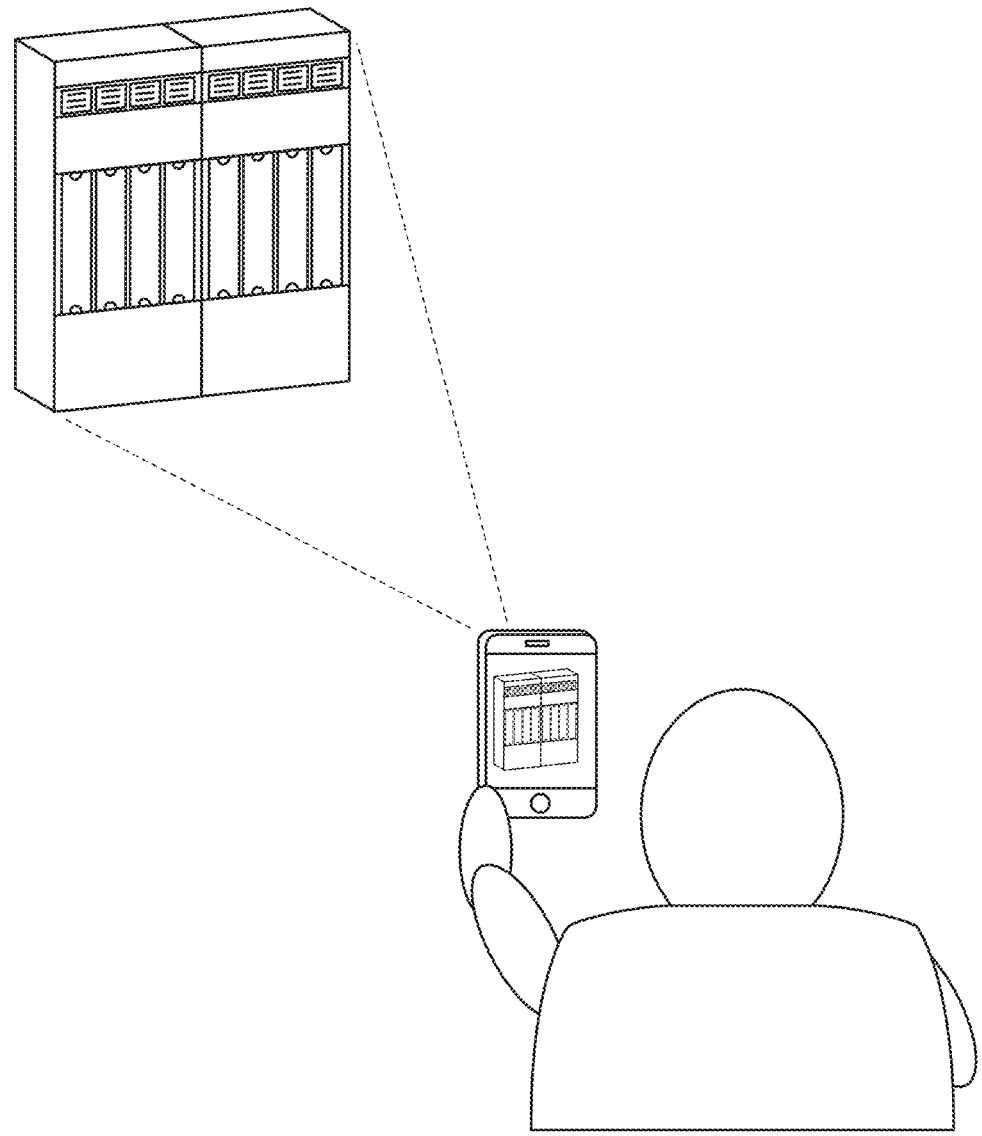
FIG. 8 is an illustration of the mobile device of FIG. 7 being positioned using a live video feed.

FIG. 8 is an illustration of the smartphone 901 being positioned by a user using the live video feed as just described. As the figure shows, a user, such as an install technician, may be holding the smartphone 901 such that the touch screen 904 is facing, and thus is visible to, the user. Because the camera 905 is located on the side of the smartphone 901 opposite the touch screen 904 (i.e., is located on the device back 903), the camera 905 faces away from the user. The camera 905 is thus "looking" in the same direction as the user and is generally "seeing" the same scene as the user, varying somewhat with the exact orientation of the smartphone 901 and the camera's field of view. Both the user and camera are "looking" at telecommunication equipment. The user is using the displayed perspective of the smartphone 901 to orient the smartphone so that the desired telecommunication equipment component is in view of the camera 905. In a typical use case, this would be so that the user could capture an image of telecommunication equipment that the user, or an associated party, has just installed.

Figure 9:
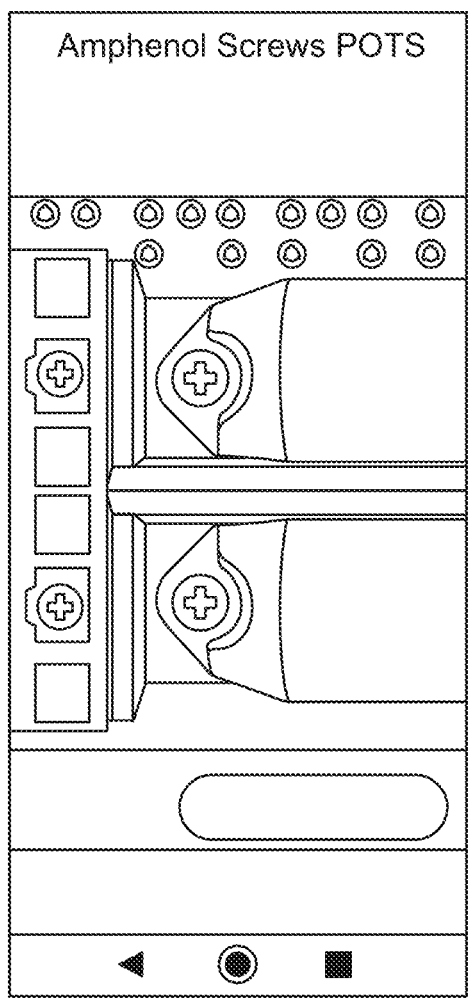
FIG. 9 is an illustration giving a more detailed view of the mobile device and its live video feed shown in FIG. 8.

FIG. 9 is an illustration of giving a more detailed view of the smartphone 901 displaying a live video feed as just described in FIG. 8. As just mentioned, the smartphone 901 is oriented so that the camera 905 is facing in the same direction as the user. The telecommunication equipment is displayed on the touch screen 904 as video, allowing the user to have a real-time feedback on what the camera 905 is "seeing" given the smartphone's current position and orientation. More precisely, because the user (specifically, the user's eyes) and the camera 905 are located in approximately the same position and are facing approximately the same way, the user can compare their own viewpoint to the viewpoint shown on the touch screen 904. Based on this comparison, the user may quickly judge the orientation of the smartphone relative to their own orientation. The user can also quickly judge how the smartphone should be shifted (e.g., by the user moving) and how it should be reoriented (e.g., by the user rotating the phone) so that the desired object is in view. In this case, the desired object is the line cards within the telecom equipment cabinet shown on the touch screen 904. Additionally, because the touch screen 904 is showing a live feed of the smartphone's perspective, this process can be repeated iteratively, making finer and finer adjustments until the camera is positioned so that the object is sufficiently in view. By relying on the inherent visual processing of a human user, this process allows the smartphone to be positioned with the needed accuracy quickly and intuitively.

In addition to displaying a live video feed of the image sensor's current view on the digital display 103, in some embodiments, a semi-transparent outline of a target telecommunication equipment component superimposed over the images from the image sensor 102 on the digital display 103 to provide additional assistance in guiding the user to correctly position the mobile device camera. Specifically, in some embodiments, a user may provide input to the mobile device 101 indicating a target telecommunication equipment component the user wishes to have the mobile device 101 evaluate the installation of. Using this information, the processor 106 may retrieve a semi-transparent outline of the target telecommunication equipment component information from the memory 104 and may combine this semi-transparent outline with the images from the image sensor 102 to create composite images. The processor 106 may then interact with the digital display 103 to cause these composite images to be displayed to the user.

By aligning the target telecommunication equipment component with this semi-transparent outline, a user may ensure that a quality image is taken. In particular, the semi-transparent outline may be designed such that aligning the image with the telecommunication equipment component ensures that the mobile device is at a predefined orientation (e.g., angle) and a predefined distance from the component (e.g., 3 feet away). This may ensure that the component is completely within the captured image with a large angular size and a consistent rotation. This may assist the processor 106 in accurately evaluating the telecom component image 602. It may also help ensure the image 602 accurately shows, i.e., can act as quality evidence, that the telecommunication equipment and components shown in the telecom component image 602 are correctly installed.

In terms of how the semi-transparent outline is created, the outline may be an image of an example telecommunication equipment component (that is correctly installed). Ideally, this image is representative of all telecommunication equipment components that are from the same model. For example, the image may be digitally generated from the computer-aided design (CAD) file used as the blueprint from which the telecommunication equipment component was created. As another example, the image may be from a photograph of a physically installed telecommunication equipment component. This photo may include just the telecommunication equipment component, or it may also include the immediate surroundings of the telecommunication equipment component to provide additional context in guiding the user in aligning the outline. The outline may also be a wire-frame model or be otherwise simplified.

In some embodiments, the processor 106 indicates whether the telecommunication equipment components shown in the telecom component image 602 were correctly installed by displaying a graphical element on a digital display. Specifically, as previously mentioned, the output device 103 may comprise a digital display. To inform the user about the results of its determination, the processor 106 may interact with digital display 103 to cause the digital display to show a graphical element indicating whether the detected telecommunication equipment components are correctly installed or not. For example, in some embodiments, the processor 106 may cause the output device 103 to display, over the telecom component image 602, a green box stating "Correctly Installed" or a red box stating "Incorrectly Installed," depending on the processor's determination vis-à-vis the installation of the components shown in the telecom component image 602. Similarly, in some other embodiments, the processor 106 may cause the output device 103 to display, over the telecom component image 602, bounding boxes surrounding each identified telecommunication equipment component along with text identifying the component within each bounding box. In this case, the processor 106 may also cause the output device 103 to display, for each of the bounding boxes, a graphical element indicating whether that particular telecommunication equipment component was correctly installed or not.

Figure 10:
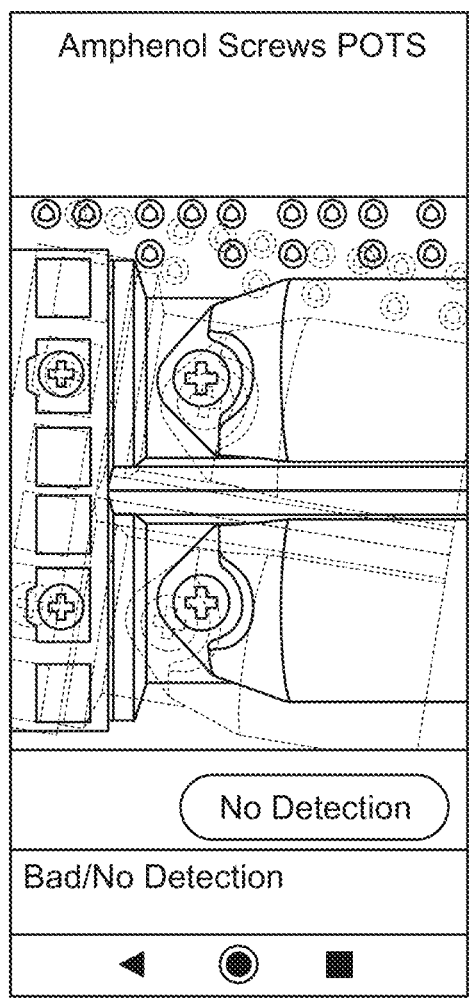
FIG. 10 is an illustration of a live video feed with a misaligned semi-transparent overlay.
Figure 11:
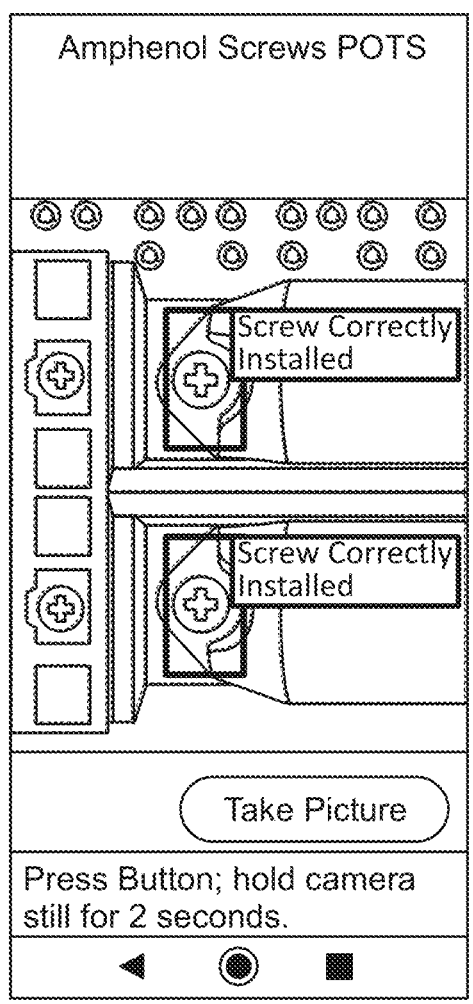
FIG. 11 is an illustration of a live video feed with an aligned semi-transparent overlay.

FIG. 10 and FIG. 11 are illustrations of a live video feed with a semi-transparent overlay described above. As previously mentioned, a user may select a specific telecommunication equipment component from a list, as discussed further below. As shown here, the telecommunication component is listed at the top of the display: the component is an "Amphenol Screw" which is a component of the "POTS" telecommunication equipment. Since the telecommunication equipment component is a specific instance of a particular design, it is possible to know in advance what this design of component should look like when correctly installed. Thus, one can create and store an example image of a correctly installed prototype (i.e., an ideal realization) for this telecommunication equipment component's design. This can include both the component itself and possible background components, for context. This example protype image can then be displayed semi-transparently over the live video feed on the digital display 103.

In terms of mechanics, the semi-transparent overlay of a correctly installed protype of the telecommunication equipment component is used to guide the user in properly positioning the device 103. In some instances, when the semi-transparent overlay of the prototype is not sufficiently aligned with the telecommunication equipment component, the processor 106 may not be able to detect the telecommunication equipment component, even if it is otherwise within the image sensor's current view. In this case, as shown in FIG. 10, a graphical element indicating that the telecommunication equipment component has not been detected may be displayed. In some instances, when the semi-transparent overlay of the prototype is sufficiently aligned with the telecommunication component, the processor 106 may detect the telecommunication equipment component. In this case, as shown in FIG. 11, graphic elements indicating the name and location of each identified component (e.g., a labeled bounding box) may be displayed. Additionally, if the processor 106 also determines that the identified telecommunication equipment components are correctly installed, a graphical element indicating that a photo may be taken may be displayed.

In some embodiments, the processor 106 may also indicate, for any telecommunication equipment components determined to be installed incorrectly, what about the installation of those components is incorrect. For example, if a particular telecommunication equipment component typically requires screws (e.g., to secure the equipment to a mount, such as an equipment rack), the presence or absence of screws may be one of the features that are identified in the process of identifying the telecommunication equipment component from the image 602. Additionally, the processor 106 may also indicate for these components what should be done to correct the defective installation. To continue the screw example from above, the installation recognition information may include information that heavily weight the absence of screws as indicating an incorrect installation. Using this information, the processor 106 may indicate that the installation is incorrect because the screws are absent. More specifically, the processor 106 may cause the output device 103 to display a bounding box around the portion of the telecom component image 602 where the screws should be present along with a graphical element indicating that the telecommunication equipment is missing the screws in the indicated area.

In some embodiments, the processor 106 may also, as part of evaluating the telecom component image 602, determine whether the telecom component image 602 meets a threshold level of quality. This helps ensure the accuracy of the processor's determination but is not required; some embodiments may not evaluate the quality of image 602, either explicitly or implicitly. Specifically, the processor 106 may evaluate a variety of parameters about the component image 602, such as light level, the focus of the image, the image's orientation with respect to the ground, whether the telecom equipment components are centered in the image or are partially cut-off by the edges of the image, and the like. In some embodiments, the quality of the image may be evaluated for its suitability for being analyzed to determine if shown telecommunication equipment components are correctly installed. In other words, in some embodiments the processor 106 may only be able to accurately evaluate the telecom component image 602 when the characteristics of the telecom component image 602 fall within certain thresholds. In this case, the processor 106 may first evaluate the telecom component image 602 to determine that it is suitable for enabling an accurate analysis before proceeding to analyze (or attempt to analyze) any telecommunication equipment components shown in the telecom component image 602. The processor 106 may also provide output to the user indicating if the image quality is sufficient to enable accurate analysis of any depicted telecommunication equipment components.

Relatedly, the quality of the telecom component image 602 may be implicitly, rather than explicitly, evaluated when analyzing (or attempting to analyze) the image 602 to identify one or more telecommunication equipment components shown in the image 602. For example, a neural network, such as the neural network 801, may be trained only on images that fall well within the ability of the neural network to accurately analyze. As a result, the neural network is trained to exclude images, even those it could otherwise accurately analyze, if they do not fall within similar parameters. In effect, this means the neural network evaluates the quality of the telecom component image as an inherent part of (and simultaneous with) its evaluation of the image 602 to identify one or more telecommunication equipment components and to determine whether they are correctly installed.

In some embodiments, the telecom component image 602 may, after being analyzed, be saved as evidence showing that the telecom equipment and telecom equipment components shown in the telecom component image 602 were correctly installed. Additionally, the telecom component image 602 may also be saved with metadata assisting with this purpose, such as the date and time the telecom component image 602 was captured, the GPS coordinates of the mobile device 101 when the telecom component image 602 was captured, the email address (or other identifier) of the individual who installed the telecommunication equipment components shown in the telecom component image 602, the serial number of the telecommunication equipment components shown in the telecom component image 602, and/or data regarding the overall installation project or job for which telecommunication equipment components shown in the telecom component image 602 were installed.

Additionally, in those embodiments where the telecom component image 602 will be saved as evidence, the quality of the telecom component image 602 may be evaluated to determine whether the telecom component image 602 meets a certain threshold of quality. Specifically, the processor 106 may evaluate a variety of parameters about the component image 602, such as light level, the focus of the image, the image's orientation with respect to the ground, whether the telecom equipment components are centered in the image or are partially cut-off by the edges of the image, and the like. In some embodiments, the quality of the image may be evaluated for the clarity with which it shows any desired telecommunication equipment components and the lack of any ambiguity about whether the telecommunication equipment components in the image are correctly installed. The processor 106 may also provide output to the user indicating if the image quality is sufficient to be saved (and to potentially be used as evidence of a correct installation).

Note that the concept of the telecom component image's quality with regards to being used as evidence is different from, though related to, the earlier discussed concept of the telecom component image's quality with regards to being analyzed. In the earlier case, the focus was on whether the processor 106 could accurately identify equipment shown in the image, i.e., the focus was on meeting any restrictions on accurate analysis stemming from the processor 106. Here, in contrast, the focus is on whether a human observer can accurately identify the telecommunication equipment shown in the telecom component image 602 and can determine, based on the image, that the telecom equipment components shown are correctly installed. These two objectives can differ from one another depending on the relative capabilities of the processor 106 and a human observer. The processor 106 may be superior to humans at analyzing images in certain conditions and be inferior at analyzing in other conditions.

Also note, however, that while these two types of quality are conceptually distinct, the evaluation of the telecom component image 602 with respect to them may not be. In other words, how the processor 106 evaluates the telecom component image 602 to determine the image's quality may implicitly or explicitly evaluate both types of quality simultaneously and as part of the same process. For example, a neural network, or a sub-part of a larger neural network, such as neural network 801, may be trained to evaluate the quality of an image. In some embodiments, the neural network may be trained to recognize, and thus only accept, images whose quality was sufficient for both being used as evidence and being analyzed to determine if telecommunication equipment shown in the image was correctly installed. In other words, the neural network was trained using images where both qualities were met. As a result, when the neural network evaluates the quality of an image, it implicitly evaluates the image quality to ensure both goals are met. Alternatively, the neural network (or two neural networks paired together) could be trained to evaluate each type of quality independently. One neural network could be trained using image where the image quality for being used of evidence is sufficient (including images where the quality for being analyzed is insufficient) while the other could be trained using images where the image quality for being analyzed is sufficient (including images where the quality for being used as evidence is insufficient).

In some embodiments, the image evaluation logic 601 and the process of verifying the installation of telecommunication equipment described above may be part of a software application running on the mobile device 101. For example, the process may be part of a software application ("app") used by an install technician installing various telecommunication equipment and telecommunication equipment components. In some embodiments, the technician may need to log into the app using a username and password. Based on the technician logging into the app, the app may display a list of jobs being worked on by the technician. The technician may select the job from this list on which the technician is currently working. Associated with this job may be a list of various telecommunication equipment and telecommunication equipment components that are to be installed. Based on what the equipment and components are, the app may then display a list of telecommunication equipment and telecommunication equipment components of which the technician is to take a photograph. For example, the app may prompt the technician to capture an image of a connector of a line card to show that the line card has been properly connected to another piece of equipment. The app may require that the photographs of certain components be taken before the photographs of other components are taken, e.g., because the first component would be obscured or otherwise hidden after the second component is installed.

Figure 12:
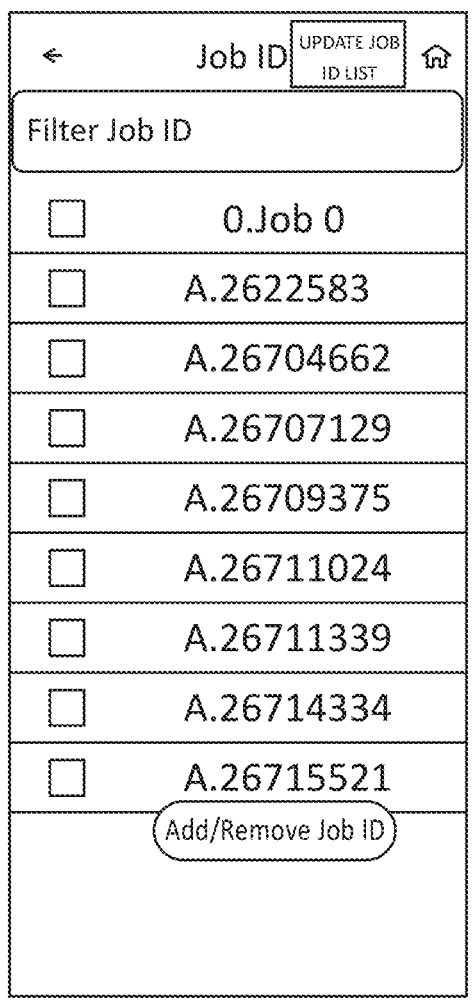
FIG. 12 is an illustration of an application displaying a job list.

FIG. 12 is an illustration of an application displaying the list of jobs described above. As shown by the image, after logging into the app, the technician is presented with a list of jobs or projects with which the technician is associated. These jobs may be identified by various means, shown here as a set of alphanumeric job IDS. Each job can be associated with one or more sites that telecommunication equipment will be installed. These jobs may also be associated with a specific entity, e.g., a telecommunications service provider. Additionally, the technician may be associated with a job because the technician is assigned to or otherwise responsible for at least part of the installation associated with the job. In terms of mechanics, the technician may select a job from the provided list by, for example, tapping on the desired job ID. After selecting the desired job, the application may display a list of telecommunication equipment that are slated to be installed as part of the selected job.

Figure 13:
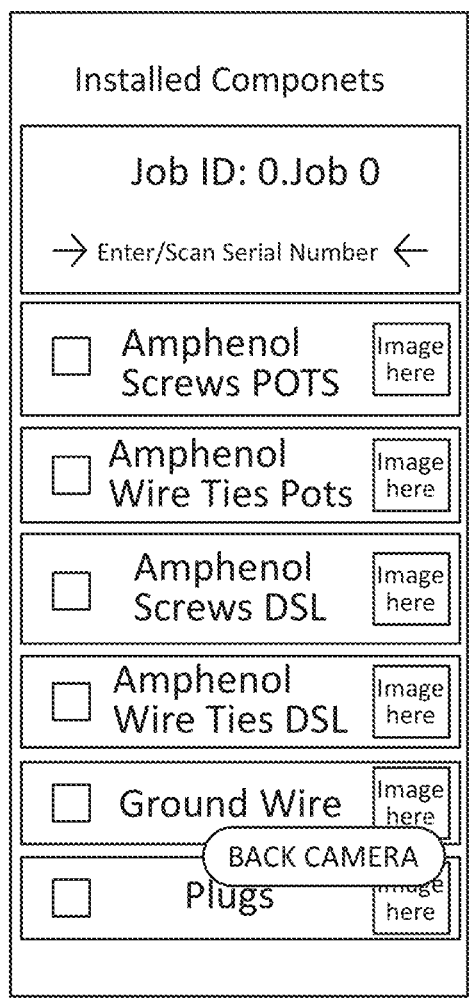
FIG. 13 is an illustration of an application displaying an equipment install list.

FIG. 13 is an illustration of an application displaying the equipment install list described above. As just mentioned, after the user selects a job from the job list, the technician is presented with a list of telecommunication equipment components that are schedule to be installed as part of the selected job. As shown here, the equipment install list may not list all telecommunication equipment, but rather may list only certain telecommunication equipment or certain specific components of the telecommunication equipment. In particular, only the telecommunication equipment components that have been selected to have their picture taken may be listed. The listed telecommunication components may be identified by various means, shown here as the name of the telecommunication equipment component, the specific telecommunication equipment the component is part of, and a small picture of an example of the telecommunication equipment component. In terms of mechanics, the technician may select a telecommunication equipment component from the provided list by, for example, tapping on the name of the component. After selecting the desired component, the application may then display a live video feed from the smartphone's camera with a transparent overlay of an example of the selected telecommunication equipment component.

In a typical use case, the technician installs a particular telecommunication equipment component and then selects the component from the telecommunication equipment list. This application then displays a live stream of images (i.e., a video feed, composed of individual image frames) from the mobile device's camera to aid the user to capturing an image of the selected telecommunication equipment component. This live stream may also include a semi-transparent overlay of the selected telecommunication equipment component to aid the technician in properly positioning the camera. The app may, in the meantime, by evaluating images (image frames) retrieved from the camera (or some subset of them, such as every third image (third image frame)) to determine if the selected telecommunication equipment component is shown in the image and if it is correctly installed, according to the process discussed previously.

After making the determination, the app may then display to the user the result of its determination on whether the selected telecommunication equipment is detected (i.e., is shown, assuming the app is being fully accurate) and, if it is detected, whether it is installed correctly or not. If the component is not installed correctly, the app may display a message on the smartphone's display indicating that the component is not installed correctly and, in some embodiments, may indicate what about the component's installation is incorrect. Conversely, in some embodiments, if the selected telecommunication equipment is detected and determined to be installed correctly, the app may display a message indicating that the component is installed correctly and may save (or prompt the user to save) the analyzed image for evidentiary purposes. This image may be uploaded to a cloud storage system associated with the app, along with metadata indicating when and where the photograph was taken, what is depicted within it, and other potential useful information.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The devices, modules, and other functional units described in this disclosure can be implemented by hardware, or software, or a combination of hardware and software. One of ordinary skill in the art will also understand that the above described devices, modules, and other functions units may be combined or may be further divided into a plurality of sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

Now, therefore, the following is claimed:

1. A mobile device for ensuring the proper installation of telecommunications equipment, comprising:
    an image sensor configured to generate a first image of at least one component of the telecommunications equipment, wherein the at least one component is of a particular model of telecommunication equipment components;
    a display device configured to display an image stream from the image sensor, thereby providing displayed images of the at least one component, wherein the displayed image stream includes the first image of the at least one component;
    memory for storing an artificial neural network trained to identify the at least one component and to recognize an appearance that a telecommunication equipment component from the particular model of telecommunication equipment component has when correctly installed; and
    at least one processor configured to:
        control the display device such that a graphical element is displayed on the display device with the displayed images of the at least one component, wherein the graphical element is for guiding a user to position the mobile device at a predefined orientation and distance relative to the telecommunications equipment, wherein the graphical element comprises a semi-transparent overlay defining an image of at least one correctly installed component of telecommunications equipment, and wherein the predefined orientation and distance correspond to a state for which the image of the at least one correctly installed component of the semi-transparent overlay aligns with the at least one component of the telecommunication equipment in the displayed image stream;
        analyze the first image using the artificial neural network to determine whether the at least one component is correctly installed, and
        provide an output indicating whether the at least one component is determined to be correctly installed by the at least one processor.

2. The mobile device of claim 1, wherein the artificial neural network is trained to recognize the appearance that a telecommunication equipment component from the particular model of telecommunication equipment component has when correctly installed by identifying features that are associated with the at least one component being correctly installed and by identifying features that are associated with the at least component being incorrectly installed.

3. The mobile device of claim 1, wherein:
the at least one component is determined to be installed incorrectly, and
the graphical element further comprises information indicating the whereabout of the at least one component that is installed incorrectly.

4. The mobile device of claim 1, wherein responsive to determining the at least one component is correctly installed, the at least on processor is configured to save the first image to a storage unit along with metadata correlating the first image to at least one of the group including: a date and time the first image was generated, GPS coordinates at which the first image was generated, information identifying the one or more individuals who installed the at least one component, or information identifying the at least one component.

5. The mobile device of claim 1, wherein the at least one processor is configured to display a list of components of telecommunication equipment, and wherein the at least one processor is configured to display the semi-transparent overlay in response to selection of the at least one component from the displayed list of components by the user.

6. The mobile device of claim 5, wherein the image defined by the semi-transparent overlay includes background components.

7. The mobile device of claim 5, wherein the at least one processor is configured to display a list of jobs for installing telecommunication equipment at a plurality of locations, and wherein the at least one processor is configured to display the list of components in response to selection of a job from the displayed list of jobs by the user.

8. A method for ensuring the proper installation of telecommunications equipment, the method comprising:
generating a first image of at least one component of the telecommunications equipment;
analyzing the first image to determine whether the at least one component is correctly installed by comparing the first image to predefined data associated with the at least one component;
providing an output indicating whether the at least one component is determined to be correctly installed;
generating a composite image stream by overlaying each image of a first image stream with a graphical element, wherein the first image stream includes the first image of the at least one component, wherein the graphical element is for guiding a user to position a mobile device generating the first image stream and the first image of the at least one component at a predefined orientation and distance relative to the telecommunication equipment, wherein the graphical element comprises a semi-transparent overlay defining an image of at least one correctly installed component of telecommunications equipment, and wherein the predefined orientation and distance correspond to a state for which the image of the at least one correctly installed component of the semi-transparent overlay aligns with the at least one component of the telecommunication equipment in the composite image stream; and
displaying the composite image stream.

9. The method of claim 8, wherein:
the at least one component is of a particular model of telecommunication equipment components; and
the predefined data associated with the at least one component contains information to identify the at least one component and to recognize an appearance that a telecommunication equipment component from the particular model of telecommunication equipment component has when correctly installed.

10. The method of claim 8, wherein:
the predefined data associated with the at least one component is part of an artificial neural network,
the artificial neural network is trained to identify the at least one component and to recognize an appearance that a telecommunication equipment component from the particular model of telecommunication equipment component has when correctly installed, and
analyzing the first image to determine whether the at least one component is correctly installed by comparing the first image to predefined data associated with the at least one component comprises processing the first image with the artificial neural network.

11. The method of claim 8, wherein one or more characteristics of the graphical element depend on whether the at least one component is determined to be correctly installed by the at least one processor.

12. A non-transitory computer readable medium comprising instructions that, when executed by one or more processors, cause the one or more processors to ensure the proper installation of telecommunication equipment by:
generating a first image of at least one component of the telecommunications equipment;
analyzing the first image to determine whether the at least one component is correctly installed by comparing the first image to predefined data associated with the at least one component;
providing an output indicating whether the at least one component is determined to be correctly installed;
generating a composite image stream by overlaying each image of a first image stream with a graphical element, wherein the first image stream includes the first image of the at least one component, and wherein the graphical element is for guiding a user to position a mobile device generating the first image stream and the first image of the at least one component at a predefined orientation and distance relative to the telecommunication equipment, wherein the graphical element comprises a semi-transparent overlay defining an image of at least one correctly installed component of telecommunications equipment, and wherein the predefined orientation and distance correspond to a state for which the image of the at least one correctly installed component of the semi-transparent overlay aligns with the at least one component of the telecommunication equipment in the composite image stream; and
displaying the composite image stream.

13. The non-transitory computer readable medium of claim 12, wherein:
the at least one component is of a particular model of telecommunication equipment components, and
the predefined data associated with the at least one component contains information to identify the at least one component and to recognize an appearance that a telecommunication equipment component from the particular model of telecommunication equipment component has when correctly installed.

14. The non-transitory computer readable medium of claim 12, wherein:
the predefined data associated with the at least one component is part of an artificial neural network,
the artificial neural network is trained to identify the at least one component and to recognize an appearance that a telecommunication equipment component from the particular model of telecommunication equipment component has when correctly installed, and analyzing the first image to determine whether the at least one component is correctly installed by comparing the first image to predefined data associated with the at least one component comprises processing the first image with the artificial neural network.

15. The method of claim 12, wherein one or more characteristics of the graphical element depend on whether the at least one component is determined to be correctly installed by the at least one processor.

* * * * *